United States Patent
Sung et al.

(10) Patent No.: US 8,611,374 B2
(45) Date of Patent: Dec. 17, 2013

(54) METHOD FOR PDU REORDERING IN WIRELESS COMMUNICATION SYSTEM

(75) Inventors: Nak Woon Sung, Daejeon (KR); Kyung Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 296 days.

(21) Appl. No.: 13/120,277

(22) PCT Filed: Mar. 20, 2009

(86) PCT No.: PCT/KR2009/001445
§ 371 (c)(1),
(2), (4) Date: Mar. 22, 2011

(87) PCT Pub. No.: WO2010/044521
PCT Pub. Date: Apr. 22, 2010

(65) Prior Publication Data
US 2011/0176492 A1   Jul. 21, 2011

(30) Foreign Application Priority Data
Oct. 13, 2008   (KR) .................... 10-2008-0100231

(51) Int. Cl.
*H04J 3/24*   (2006.01)
(52) U.S. Cl.
USPC ................ 370/474; 370/328; 370/394
(58) Field of Classification Search
None
See application file for complete search history.

(56) References Cited

U.S. PATENT DOCUMENTS 7,116,667 B2 * 10/2006 Jiang et al. ..................... 370/394
7,130,295 B2 * 10/2006 Kim et al. ..................... 370/349

(Continued)

FOREIGN PATENT DOCUMENTS

EP   1 919 114 A1   5/2008
EP   1 993 241 A1   11/2008

(Continued)

OTHER PUBLICATIONS

Sung et al., Improving TCP Performance Using PDU Reordering in WiBro Multi FA Access Terminal, 10th International Conference on Advanced Communications Technology, Feb. 17-20, 2008, pp. 1376-1379.

*Primary Examiner* — Bob Phunkulh
(74) *Attorney, Agent, or Firm* — Jefferson IP Law, LLP (57) ABSTRACT

The present invention relates to a protocol data unit (PDU) reordering method in a wireless communication system. The terminal maintains the number of bytes of PDUs stored in the buffer for reordering PDUs received in a sequence that is changed due to HARQ error correction to thereby prevent overflow of the reordering buffer. When the HARQ function unit transmits a PDU received at the radio access control RAS (S101), the PDU reordering unit of the access terminal sets a current frame number as an arrival frame number of the received PDU (S102). When a current frame number is stored as an arrival frame number of a received frame, the PDU reordering unit compares a sequence number (SN) of a received PDU with a sequence number of a PDU that is about to be reordered (S 103). If the PDU has already been reordered, the received PDU is discarded (S 104). Else, the PDU reordering unit calculates an average size of a buffer that is required for storing the received PDU by using a moving average calculation equation (S 105).

13 Claims, 6 Drawing Sheets

(56) References Cited

U.S. PATENT DOCUMENTS

| | | |
|---|---|---|
| 7,593,407 B2 * | 9/2009 | Chun et al. .................. 370/394 |
| 7,633,892 B2 * | 12/2009 | Yi et al. ..................... 370/312 |
| 7,646,791 B2 * | 1/2010 | Jiang ......................... 370/474 |
| 7,881,298 B2 * | 2/2011 | Jang et al. .................. 370/392 |
| 7,978,640 B2 * | 7/2011 | Lee et al. .................... 370/313 |
| 2005/0100048 A1 * | 5/2005 | Chun et al. .................. 370/468 |
| 2008/0107053 A1 | 5/2008 | Kim et al. |
| 2008/0146214 A1 | 6/2008 | Kim et al. |
| 2008/0181166 A1 * | 7/2008 | Lee et al. .................... 370/313 |
| 2008/0209297 A1 | 8/2008 | Chandra et al. |
| 2008/0219195 A1 * | 9/2008 | Pani et al. ................... 370/310 |
| 2008/0225765 A1 | 9/2008 | Marinier et al. |
| 2008/0279192 A1 * | 11/2008 | Tseng ......................... 370/394 |
| 2008/0279194 A1 * | 11/2008 | Tseng ......................... 370/394 |
| 2008/0285493 A1 * | 11/2008 | Tseng ......................... 370/310 |
| 2009/0235137 A1 | 9/2009 | Umesh et al. |
| 2010/0144364 A1 * | 6/2010 | Umesh et al. ............... 455/452.1 |
| 2010/0172445 A1 | 7/2010 | Herrmann |
| 2010/0260111 A1 * | 10/2010 | Sung et al. .................. 370/328 |

FOREIGN PATENT DOCUMENTS

| | | |
|---|---|---|
| JP | 2008-118640 A | 5/2008 |
| KR | 10-2007-0114360 A | 12/2007 |
| KR | 10-2007-0119859 A | 12/2007 |
| KR | 10-2008-0052276 A | 6/2008 |
| KR | 10-2008-0056317 A | 6/2008 |
| KR | 10-2008-0078872 A | 8/2008 |

* cited by examiner

Fig. 6
Initial state frame 981: receiving PDU 30

Drop duplicated PDU frame 982: receiving PDU 31

Transmit to CS and reassembling function unit frame 983: receiving PDU 39 frame 984: receiving PDU 35, Reordering Timeout

Regard timeout, drop

Fig. 7

METHOD FOR PDU REORDERING IN WIRELESS COMMUNICATION SYSTEM

TECHNICAL FIELD

The present invention relates to a protocol data unit (PDU) reordering method in a wireless communication system, and a terminal that performs the same. Particularly, the present invention relates to a PDU reordering method of a terminal that supports a hybrid automatic repeat request (HARQ) function in a wireless communication system.

BACKGROUND ART

Conventionally, an automatic repeat request (ARQ) control function for error correction has been performed in a medium access control (MAC) layer. However, when the error correction is performed by using the ARQ function, a relatively long delay time occurs and complexity of the error correction performance is increased.

Therefore, in order to solve the problems, a HARQ function performed for error correction in a physical layer (PHY) has been suggested. The HARQ function transmits a burst in the PHY, and when receiving a negative acknowledgement (NACK) for the burst transmission (i.e., when an error occurs in the burst transmission), it performs error correction by retransmitting the corresponding burst.

When the ARQ function and the HARQ function are simultaneously performed, delay time and function duplication occur. In addition, in a wireless communication system such as a wireless broadband (hereinafter, referred to as WiBro) system does not define PDU reordering that occurs due to burst retransmission for a HARQ function. Therefore, when the error correction is performed by the HARQ function in the wireless communication system, a problem in which a PDU and a service data unit (SDU) may not be transmitted according to a sequence number may occur if an ARQ function is not supported in a MAC layer. However, it is inappropriate to perform the ARQ function in the MAC layer for a service that requires prompt data transmission due to complexity in operation and generation of delay. In addition, when a function of securing a PDU sequence is added, retransmission time cannot be secured so that system performance may be influenced thereby.

Meanwhile, when the ARQ function is used, a transmitting side transmits an ARQ block within an ARQ window size and additionally transmits an ARQ block within an ACK range so that generation of buffer overflow in a receiving size can be prevented. However, when the ARQ function is not used, the transmitting side can transmit PDUs without radio resource limitation excluding a case that NACK occurs while performing the HARQ function so that the transmitting side retransmits. Thus, the receiving side buffers unorganized PDUs for a predetermined time period for PDU reordering when a HARQ error occurs, and accordingly, the buffer of the receiving side is overflowed so that received PDUs need to be dropped.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a PDU reordering method having advantages of improving transmission efficiency and performance by minimizing data retransmission and PDU drop in a wireless communication system, and a terminal performing the same.

Technical Solution

A reordering method according to an exemplary embodiment of the present invention is provided to a terminal for PDU reordering. The terminal supports a HARQ and includes a CS and reassembling function unit that assembles reordered PDUs to an SDU.

The reordering method includes: storing a received PDU of which a sequence number is greater than a first sequence number of a PDU reordering sequence in a reordering buffer that stores PDUs queued for reordering; determining whether to drop a PDU of the first sequence number based on an average size of a buffer that is required for storing the received PDU; updating the second sequence number with the next sequence number of a dropped PDU; transmitting a PDU of which a sequence number is the same as the updated first sequence number among the PDUs queued in the reordering buffer to the CS and reassembling function unit; and updating the first sequence number with the next sequence number of the PDU transmitted to the CS and reassembling function unit.

In addition, a reordering method according to another exemplary embodiment of the present invention is provided to a terminal for PDU reordering. The terminal supports a HARQ and includes a CS and reassembling function unit that assembles reordered PDUs to a SDU.

The reordering method includes: reordering PDUs by comparing the first sequence number of a PDU reordering sequence with the second sequence number of a received PDU; among PDUs stored in a reordering buffer that stores PDUs queued for reordering, transmitting a PDU that is stored in the reordering buffer for longer than a first time to the CS and reassembling function unit; and updating the first sequence number with the next sequence number of one of the PDU reordered in the reordering of the PDUs and the PDU transmitted to the CS and reassembling function unit in the transmitting of the PDU.

Advantageous Effects

According to the present invention, the number of bytes of PDUs stored in the reordering buffer for reordering PDUs received in a sequence that is changed due to HARQ error correction is maintained to be less than a predetermined value to thereby prevent overflow of the reordering buffer.

In addition, reordering queue time of the received PDU in the reordering buffer for reordering is limited to thereby prevent generation of a retransmission timeout.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

A HARQ supporting terminal and a PDU reordering method of the HARQ supporting terminal in a wireless communication system according to an exemplary embodiment of the present invention will be described in detail with reference to the drawings.

A WiBro system will be described as an example of the wireless communication system in the exemplary embodiment of the present invention, but the present invention can be applied to other wireless communication systems.

Figure 1:
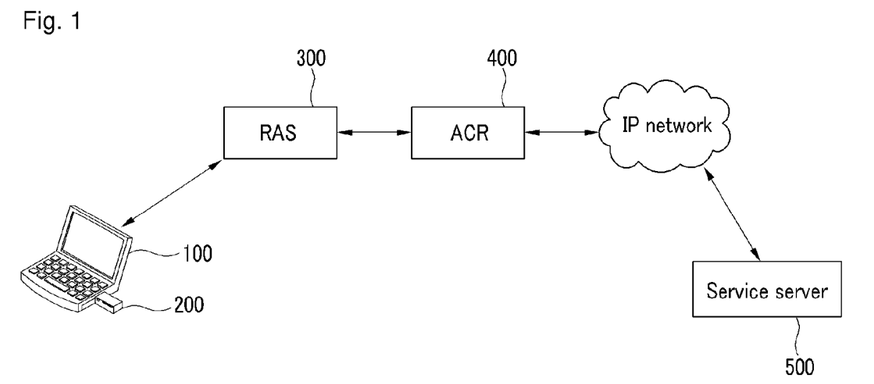
FIG. 1 is a configuration diagram of a wireless communication system according to an exemplary embodiment of the present invention.

FIG. 1 is a configuration diagram of a wireless communication system according to an exemplary embodiment of the present invention, and the wireless communication system is a WiBro system.

Referring to FIG. 1, the WiBro system includes a terminal equipment system (TES) 100, an access terminal (AT) 200, a radio access control (RAS) 300, an access control router (ACR) 400, and a service server 500.

The TES 100 includes a transmission control protocol/Internet protocol (TCP/IP) layer, and performs an Internet application program. The TES 100 accesses a service server 500 connected to an IP network through the RAS 300 and the ACR 400 and uses an Internet service. Here, the TES 100 includes a laptop and a personal digital assistant (PDA).

The AT 200 is connected to the TES 100 by using a universal service bus (USB) and a personal computer memory card international association (PCMCIA) interface, and supports the user of Internet service of the TES 100. The AT 200 is connected to the RAS 300 through wireless connection, and one RAS 300 can be connected with a plurality of TESs 200.

In addition, the AT 200 generates a packet data unit (PDU) by assembling or fragmenting service data units (SDUs) transmitted from the TES 100, and transmits a HARQ burst including at least one of PDUs to the RAS 300. Further, the AT 200 transmits an SDU that is generated by assembling PDUs included in the HARQ burst received from the RAS 300 to the TES 100. Here, the AT 200 performs a HARQ error function with the RAS 300 when transmitting/receiving a HARQ burst.

Figure 2:
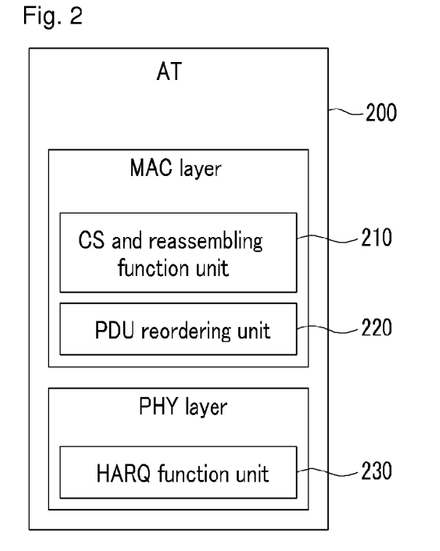
FIG. 2 is a configuration diagram of a terminal according to the exemplary embodiment of the present invention.

FIG. 2 is a configuration diagram of the AT 200 according to the exemplary embodiment of the present invention.

Referring to FIG. 2, the AT 200 includes a convergence sublayer (hereinafter, referred to as a CS) and reassembling function unit 210 and a PDU reordering unit 220 included in a MAC layer, and a HARQ function unit 230 included in a PHY layer.

The CS and reassembling function unit 210 classifies an SDU such as a TCP packet that is transmitted from the TES 100, and determines whether the corresponding SDU corresponds to a service flow that requires a new quality of service (QOS) and requests a new connection between MAC layers of the AT 200 and the RAS 300. In addition, when the new connection is established between the MAC layers of the AT 200 and the RAS 300, the CS and reassembling function unit 210 generates a PDU by fragmenting or assembling SDUs transmitted from the TES 100 according to radio resource conditions, and transmits the generated PDU to the PDU reordering unit 220. Further, when a PDU received from the RAS 300 is transmitted from the PDU reordering unit 220, the CS and reassembling function unit 210 generates an SDU by reassembling the PDU and transmits the generated SDU to the TES 100. In the exemplary embodiment of the present invention, the CS and reassembling function unit 210 does not support an automatic repeat request (ARQ) function in a MAC layer.

When a PDU received from the RAS 300 is transmitted from the HARQ function unit 230, the PDU reordering unit 220 reorders the PDU according to a PDU sequence number and transmits the sequentially reordered PDU to the CS and reassembling function unit 210. In addition, the PDU reordering unit 200 generates a PDU sequence number of the PDU transmitted from the CS and reassembling function unit 210, and inserts the generated PDU sequence number in an extended subheader (SDU_SN extended subheader) of the corresponding PDU and transmits the PDU to the HARQ function unit 230.

The PDU reordering unit 220 includes a reordering buffer (not shown), and sequentially reorders a PDU that is not sequentially transmitted due to HARQ error correction by using the reordering butter. Here, the PDU reordering unit 220 partially drops PDUs stored in the reordering buffer without regard to reordering when the amount of PDUs stored in the reordering buffer exceeds a predetermined range so as to prevent an overflow of the reordering buffer. In addition, in order to prevent a retransmission timeout from being generated, the PDU reordering unit 220 stores each of the received PDUs until a maximum delay time (MAX_REORDERING_WIN) from a current frame at arrival of the corresponding PDU. If the corresponding PDU is not reordered within this period, the PDU reordering unit 220 determines the corresponding PDU to be in a reordering timeout state and transmits the PDU to the CS and reassembling function unit 210. In addition, when reordering of PDU is delayed for longer than the maximum delay time, the PDU is dropped even though the PDU has not yet been received. Here, the maximum delay time is set to be shorter than a retransmission timeout period in order to prevent generation of a retransmission timeout.

The HARQ function unit 230 includes a PDU transmitted from the PDU reordering unit 220 in a HARQ burst and transmits the HARQ burst to the RAS 300 during a frame uplink period, and transmits the PDU extracted from the HARQ burst received from the RAS 300 during a frame downlink period to the PDU reordering unit 220. Here, the HARQ function unit 230 transmits/receives the HARQ burst according to a radio resource policy allocated from the RAS 300. In addition, when a HARQ burst transmission error occurs, the HARQ function unit 230 retransmits the corresponding HARQ, and when a HARQ burst receiving error occurs, the HARQ function unit 230 re-receives the corresponding HARQ so as to restore an error-occurred PDU.

Referring to FIG. 3 to FIG. 7, a PDU reordering method of the HARQ supporting terminal in the wireless communication system according to the exemplary embodiment of the present invention will now be described in further detail.

Figure 3:
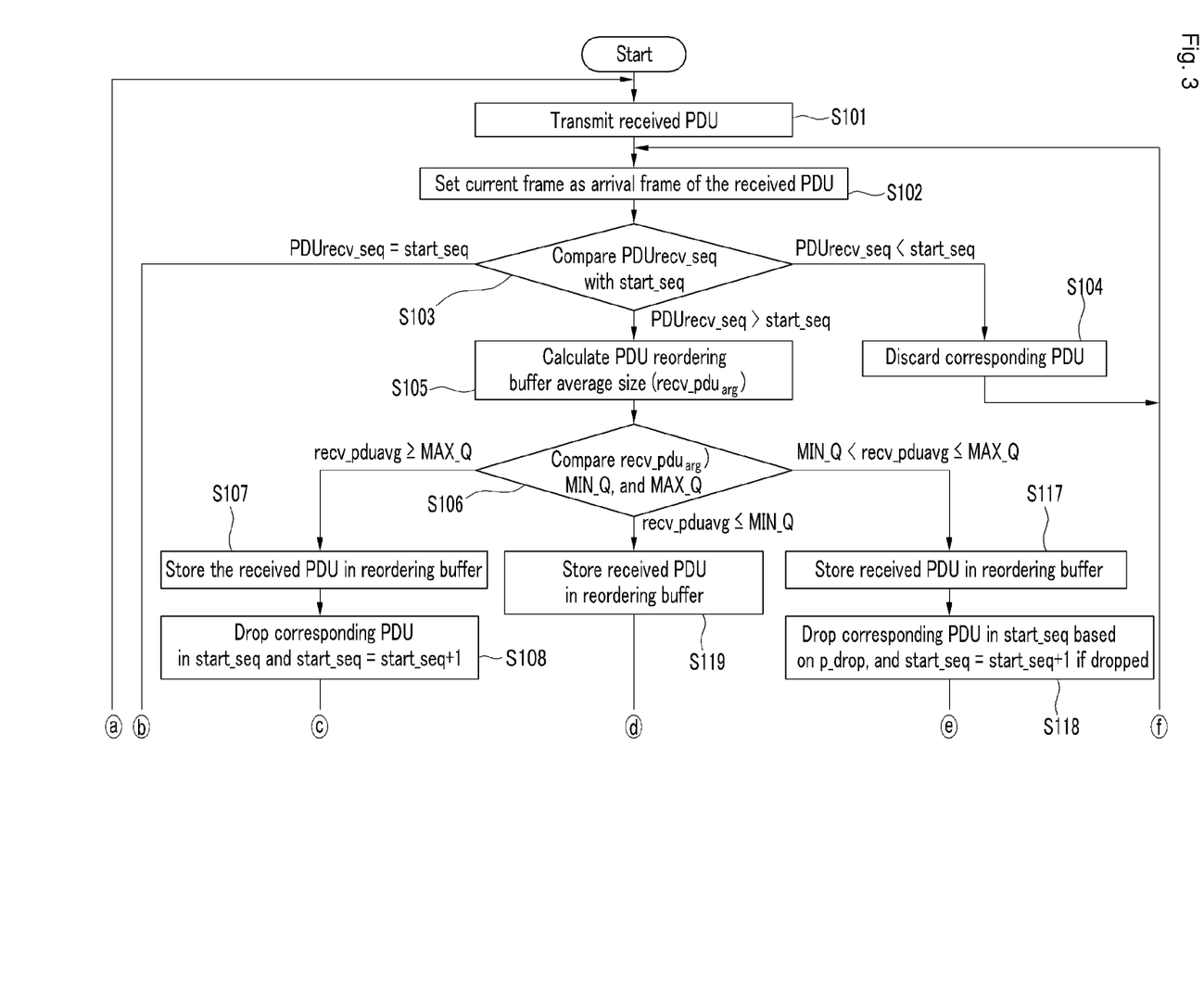
FIG. 3 and FIG. 4 are flowcharts of a PDU reordering method of a PDU reordering unit according to the exemplary embodiment of the present invention.
Figure 4:
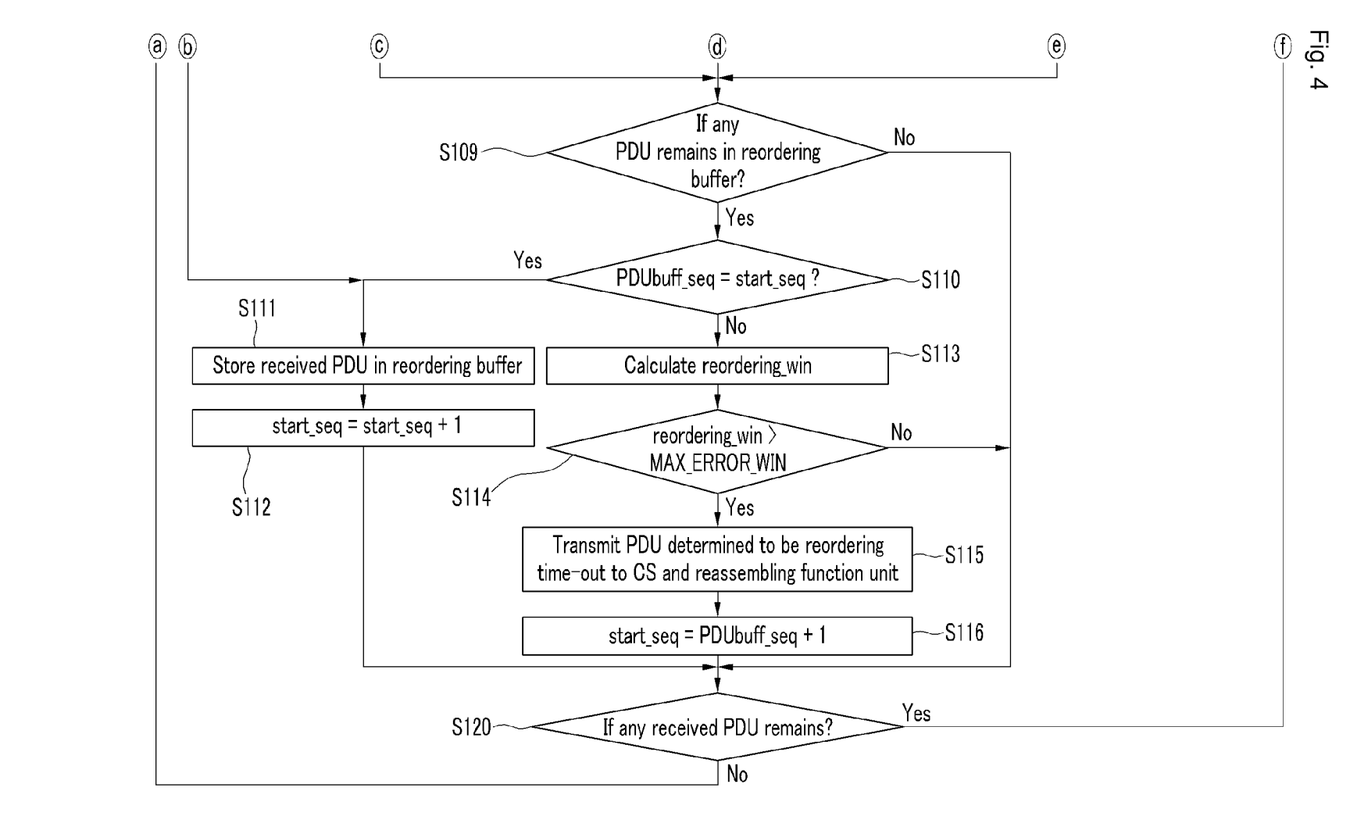
Figure 5:
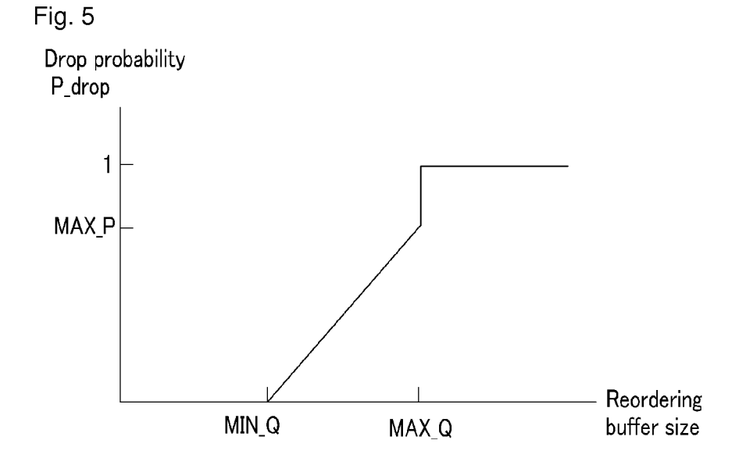
FIG. 5 is a graph of a drop probability function according to the exemplary embodiment of the present invention.

FIG. 3 and FIG. 4 are flowcharts of a PDU reordering method of the PDU reordering unit 220 according to the exemplary embodiment of the present invention. FIG. 5 shows an example of a drop probability function graph with respect to the size of the reordering buffer according to the exemplary embodiment of the present invention.

Referring to FIG. 3, when the HARQ function unit 230 transmits a PDU received at the RAS 300 (S101), the PDU reordering unit 220 of the TA 200 sets a current frame (current_frame) number as an arrival frame (arrival_frame) number of the received PDU (S102). Here, the current frame (current_frame) number is a value that is periodically updated, and it is assumed that the current frame number is transmitted to the TA 200 for each frame through a MAP in the case of a time division duplex (TDD) system or the current frame number is a timer value that is periodically updated in the case of a frequency division duplex (FDD) system. In the exemplary embodiment of the present invention, the current frame (current_frame) number is incremented by one at every receipt of a frame.

When a current frame number is stored as an arrival frame number of a received frame, the PDU reordering unit 220 compares a sequence number ($PDU_{recv\_}$seq) of a received PDU with a sequence number of a PDU that is about to be reordered, that is, a PDU that is about to be transmitted to the CS and reassembling function unit 210 (S103). Here, the sequence number of the received PDU is extracted from an extended subheader of the corresponding PDU.

When the comparison result shows that the sequence number ($PDU_{recv\_}$seq) of the received PDU is smaller than the start_seq (i.e., $PDU_{recv\_}$seq<start_seq), the PDU reordering unit 220 regards the received PDU to be duplicated, that is, a PDU that has already been reordered and transmitted to the CS and reassembling function unit 210, and discards the received PDU (S104).

On the other hand, when the sequence number ($PDU_{recv\_}$seq) of the received PDU is greater than the start_seq, the PDU reordering unit 220 calculates an average size of a buffer that is required for storing the received PDU by using a moving average calculation equation as given in Math Figure 1 (S105).

$$\mathrm{recv\_pdu}_{avg} = w*\mathrm{recv\_pdu}_i + (1-w)*\mathrm{recv\_pdu}_{i-1} \quad \text{[Math Figure 1]}$$

$\mathrm{recv\_pdu}_i$: the number of bytes of a received PDU in a current frame $\mathrm{recv\_pdu}_{i-1}$: the average number of bytes of PDUs arrived until a previous frame w: weight value, 0<w<1

When the average size ($\mathrm{recv\_pdu}_{avg}$) of the buffer for storing the received PDU is calculated as given in Math Figure 1, the PDU reordering unit 220 determines whether to partially drop PDUs that are not reordered in order to prevent overflow of the reordering buffer by using the calculated average size.

For this, the PDU reordering unit 220 compares the maximum number of bytes (MAX_Q) that can be stored in the reordering butter and the number of reference bytes (MIN_Q) for storing received PDUs without dropping PDUs with an average size ($\mathrm{recv\_pdu}_{avg}$) of a buffer for storing received PDUs (S106).

When the comparison result shows that the average size ($\mathrm{recv\_pdu}_{avg}$) of the buffer for storing the received PDUs is greater than the maximum number of bytes MAX_Q (i.e., $\mathrm{recv\_pdu}_{avg}$>MAX_Q), the PDU reordering unit 220 stores the received PDUs in the reordering buffer according to a sequence number (S107). In addition, the PDU reordering unit 220 drops a PDU corresponding to start_seq and increments start_seq by one (S108).

Referring to FIG. 4, the PDU reordering unit 220 checks whether one or more PDUs remain in the reordering buffer (S109). When a PDU remains in the reordering buffer, the PDU reordering unit 220 compares whether the earliest sequence number ($PDU_{buff\_}$seq) of a PDU among PDUs stored in the reordering buffer and the updated start_seq (S110) are identical (S110). If they are identical, the PDU reordering unit 220 reads the corresponding PDU from the reordering buffer and transmits the read PDU to the CS and reassembling function unit 210 (S111), and increments the start_seq by one (S112).

If a sequence number of a PDU stored in the reordering buffer and an updated start_seq are identical, the PDU reordering unit 220 iteratively performs the steps S111 and S112 until no PDU remains in the reordering buffer.

Meanwhile, if a sequence number $PDU_{buff\_}$seq of a PDU stored in the reordering buffer and an updated start_seq are not identical, the PDU reordering unit 220 calculates reordering delay time (reordering_win) based on a current frame number and an arrival frame number of a PDU that corresponds to the start_seq (S113). Here, the reordering delay time is a period of time during which the corresponding PDU is stored in the reordering buffer, and implies delay time from an arrival frame to a current frame of the corresponding PDU.

After that, the PDU reordering unit 220 compares the calculated reordering delay time with the maximum buffering time (MAX_REORDERING_WIN) that implies the maximum period of time during which buffering can be performed by the PDU reordering unit 220 (S114).

When the reordering delay time is greater than the maximum buffering time, the PDU reordering unit 220 determines that the corresponding PDU is in the reordering timeout state, reads the corresponding PDU from the reordering buffer, and transmits the PDU to the CS and reassembling function unit 210 (S115). Then, the PDU reordering unit 220 increments the start_seq by one from a sequence number ($PDU_{buff\_}$seq) of the corresponding PDU (S116).

Meanwhile, if a comparison result in the step of S106 shows that the average size ($\mathrm{recv\_pdu}_{avg}$) of the buffer for storing the received PDUs is greater than MIN_Q and less than MAX_Q (i.e., MIN_Q<$\mathrm{recv\_pdu}_{avg}$≤MAX_Q), the PDU reordering unit 220 stores the received PDUs in the reordering buffer based on a sequence number (S117). In addition, the PDU reordering unit 220 determines whether to drop a PDU corresponding to the start_seq based on the drop probability (P_drop) calculated as given in Math Figure 2, and increments the start_seq by one if it is determined to drop the PDU that corresponds to the start_seq (S118).

$$P\_drop = MAX\_P*\{(\mathrm{recv\_pduavg} - MIN\_Q)/(MAX\_Q - MIN\_Q)\} \quad \text{[Math Figure 2]}$$

MAX_P: Maximum probability for increasing start_seq without waiting for PDU reordering Such a drop probability function with respect to the size of the reordering buffer may be shown in a graph of FIG. 5.

As previously described, the PDU reordering unit 220 may or may not drop a PDU corresponding to the start-seq according to the drop probability if the average size ($\mathrm{recv\_pdu}_{avg}$) of the buffer for storing the received PDUs is greater than MIN_Q and less than MAX_Q. That is, whenever storing a received PDU in the reordering buffer, the PDU reordering unit 220 partially drops unreceived PDUs corresponding to the start_seq according to the drop probability rather than unconditionally dropping them. On the other hand, if the average size (recv_pdu$_{avg}$) of the buffer for storing the received PDUs is greater than MAX_Q, the PDU reordering unit 220 drops a PDU corresponding to the start_seq each time the PDU reordering unit 220 stores a received PDU in the reordering buffer.

The PDU reordering unit 220 that has partially dropped PDUs according to the drop probability as described above performs the steps S109 to S116. That is, the PDU reordering unit 220 checks if any PDU remains in the reordering buffer, and if any PDU remains in the reordering buffer, the PDU reordering unit 220 reorders the corresponding PDU or checks whether the corresponding PDU is in a reordering timeout state, and determines whether to transmit the corresponding PDU to the CS and reassembling function unit 210.

In addition, even though a result of the comparison in the step S106 shows that the average size recv_pdu$_{avg}$ of the buffer for storing the received PDUs is less than MIN_Q (i.e., recv_pdu$_{avg}$≤MIN_Q), the PDU reordering unit 220 receives the received PDUs in the reordering buffer according to a sequence number (S119), and performs the steps S109 to S116.

If a result of the comparison in the step S103 shows that the start_seq and the sequence number PDU$_{recv\_}$seq of the received PDU are identical, the PDU reordering unit 220 transmits the received PDU to the CS and reassembling function unit 210 (S111), and increments the start_seq by one (S112).

Meanwhile, the steps S102 to S118 are a reordering process for one received PDU. When a plurality of PDUs are received, the PDU reordering unit 220 iteratively performs the steps S102 to S118 for each received PDU until all the received PDUs are reordered (S120). That is, even when no PDU remains in the reordering buffer in the step S109, or when a received PDU remains in the case that a reordering delay time of a comparison target PDU is shorter than the maximum delay time in the step S114, the steps S102 to S118 are iteratively performed.

Figure 6:
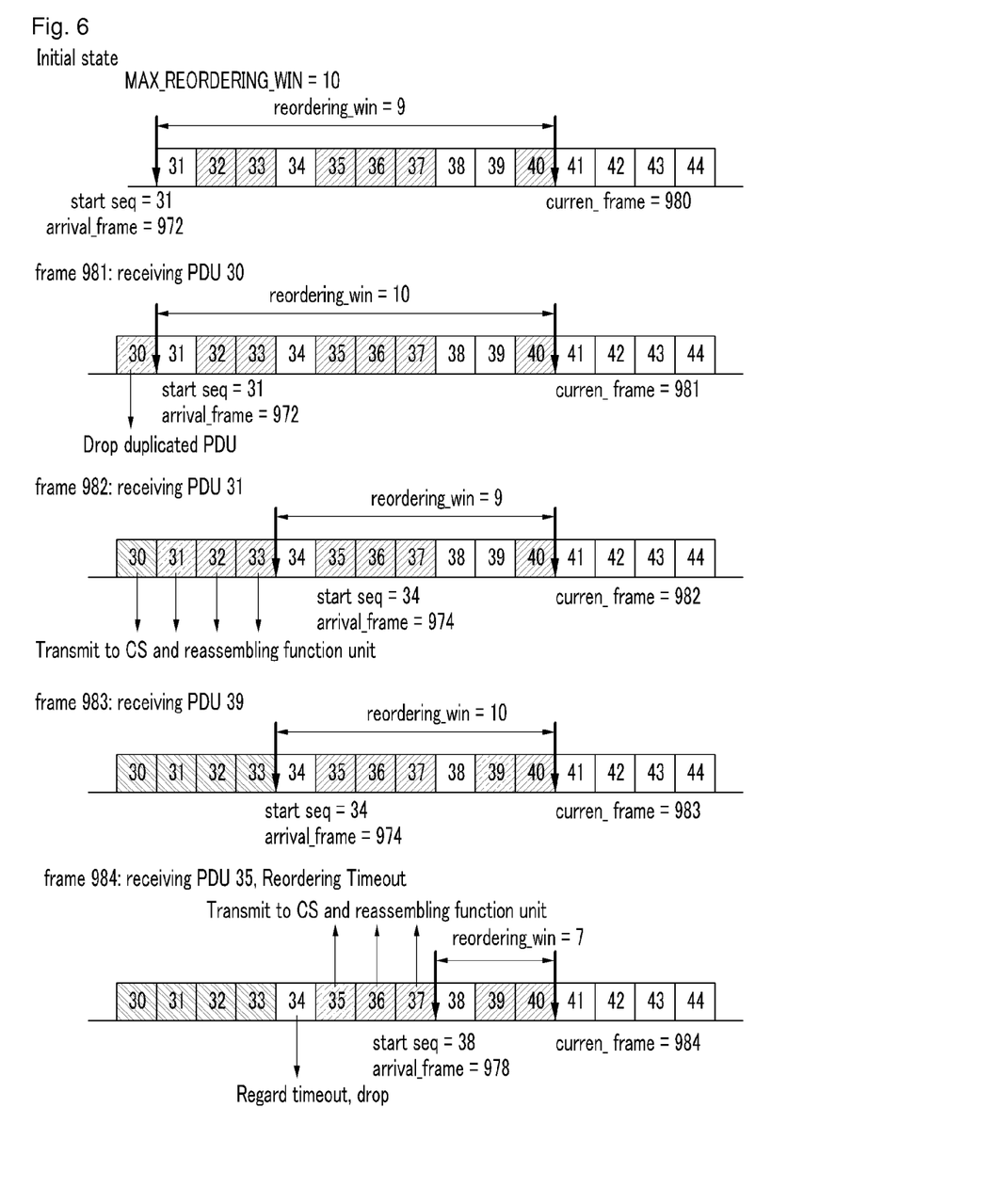
FIG. 6 and FIG. 7 are examples of PDU reordering according to the exemplary embodiment of the present invention.
Figure 7:
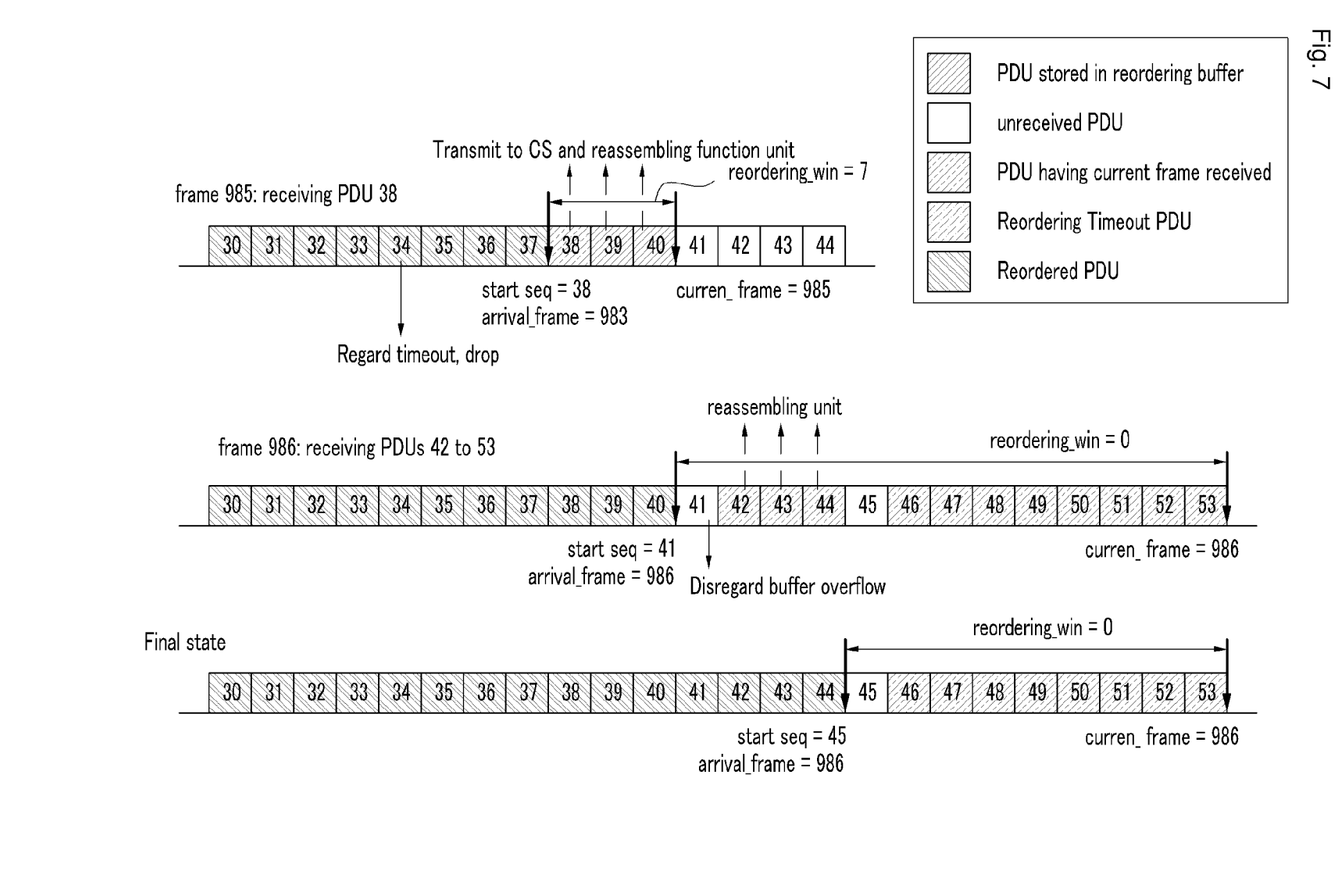

FIG. 6 and FIG. 7 show the PDU reordering processes according to the exemplary embodiment of the present invention.

Referring to FIG. 6, it is assumed that a case in which a current frame number is 980 (i.e., current_frame=980) and a sequence number and an arrival frame number of a reordering target PDU are respectively 31 and 972 (i.e., start_seq=31, arrival_frame=972) is an initial state. Here, the PDU reordering unit 220 sets a frame number at arrival of the corresponding PDU to the arrival frame number (arrival_frame), and the current frame number (current_frame) implies a number of a currently received frame. The current frame number is periodically updated, and it is assumed that the current frame number is broadcasted for each frame through the MAP in a TDD system and is a periodically-updated timer value in an FDD system. In FIG. 6, the current frame number is incremented by one for each frame.

After the initial state, PDU 30 is received in frame 981 (current_frame=981), and the PDU reordering unit 220 determines that the received PDU is a duplicated PDU and discards it since the start_seq is 31. In this case, the reordering delay time (reordering_win) becomes 10 based on the arrival frame number (arrival_frame=972) and the current frame number (current_frame=981) of first PDU among the PDUs stored in the reordering buffer.

PDU 31 is received in frame 982 (current_frame=982) and the received PDU is a PDU that corresponds to the start_seq, and therefore the PDU reordering unit 220 transmits PDU 31 to the CS and reassembling function unit 210 and increments the start_seq by one (start_seq=32). In this case, since PDUs 32 and 33 have already been stored in the reordering buffer, the PDU reordering unit 220 transmits the corresponding PDUs to the CS and reassembling function unit 210 and updates the start_seq with 34. In addition, since the arrival frame number of PDU 35 which is the first PDU among the PDUs stored in the reordering buffer is 974 (arrival_frame=974), the reordering delay time is updated with 9 (reordering_win=9).

After that, when PDU 39 is received in frame 983 (current_frame=983), the PDU reordering unit 220 stores PDU 39 in the reordering buffer based on the sequence number. In this case, since the received PDU does not correspond to the start_seq, the start_seq is not updated (start_seq=34) and the reordering delay time becomes 10 (reordering_win=10).

PDU 35 is received in frame 984 (current_frame=984). In frame 984, PDU 34 is not yet received but it is a reordering timeout state, and therefore the PDU reordering unit 220 drops PDU 34 and increments the start_seq to 35. In addition, since PDUs 35, 36, and 37 have already been received and stored in the reordering buffer, the PDU reordering unit 220 transmits the corresponding PDUs to the CS and reassembling function unit 210. Therefore, the start_seq is updated with 38 (start_seq=38) and the reordering delay time is updated with 7 (reordering_win=7) based on the arrival frame number of PDU 39.

Referring to FIG. 7, PDU 38 is received in frame 985 (current_frame=985), and PDU 38 corresponds to the start_seq, and therefore the PDU reordering unit 220 transmits PDU 38 to the CS and reassembling function unit 210. In addition, since PDUs 39 and 40 have already been received and stored in the reordering buffer, the PDU reordering unit 220 transmits the corresponding PDUs to the CS and reassembling function unit 210. Therefore, the start_seq is updated with 41 (start_seq=41), and the reordering delay time becomes 0 (reordering_win=0) since there is no PDU stored in the reordering buffer.

Excluding PDU 45, PDUs 42 to 53 are received in a burst in the 986 frame (current_frame), and the PDU reordering unit 220 stores the received PDUs in the reordering buffer. In this case, since the arrival frame number and the current frame number of the first PDU stored in the reordering buffer are identical, the reordering delay time becomes 0 (reordering_win=0).

However, the average size (recv_pdu$_{avg}$) of the buffer for storing the received PDU is greater than the MIN_Q, and therefore the PDU reordering unit 220 drops a PDU that corresponds to the start_seq based on the drop probability (P_drop). Accordingly, PDU 41 corresponding to the start_seq is regarded to be arrived, and the start_seq is incremented by one. In this case, PDUs 42, 43, and 44 have already been received and stored in the reordering buffer, and therefore the PDU reordering unit 220 transmits the corresponding PDUs to the CS and reassembling function unit 210 and updates the start_seq with 45 (start_seq=45). Therefore, when the reordering process is performed to frame 986, reordering is regarded to be completed to PDU 44, the start_seq becomes 45, and the reordering delay time becomes 0 (reordering_win=0).

As described, the number of bytes of PDUs stored in the reordering buffer for reordering is maintained to be less than a predetermined value according to the exemplary embodiment of the present invention to thereby prevent overflow of the reordering buffer.

In addition, reordering queue time of the received PDU in the reordering buffer for reordering is limited to thereby prevent generation of a retransmission timeout.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A reordering method for a terminal to reorder protocol data units (PDUs), the terminal supporting a hybrid automatic retransmission request (HARQ) and including a Convergence Sublayer (CS) and reassembling function unit that assembles reordered PDUs to a service data unit (SDU), the reordering method comprising:
   storing a received PDU of which a sequence number is greater than the first sequence number of a PDU reordering sequence in a reordering buffer that stores PDUs queued for reordering;
   determining whether to drop a PDU of the first sequence number based on an average size of a buffer that is required for storing the received PDU;
   updating the first sequence number with the next sequence number of a dropped PDU;
   transmitting a PDU of which a sequence number is the same as the updated first sequence number among the PDUs queued in the reordering buffer to the CS and reassembling function unit; and
   updating the first sequence number with the next sequence number of the PDU transmitted to the CS and reassembling function unit.

2. The reordering method of claim 1, further comprising transmitting a received PDU having a sequence number that is the same as the first sequence number to the CS and reassembling function unit.

3. The reordering method of claim 2, further comprising discarding a received PDU having a sequence number that is smaller than the first sequence number.

4. The reordering method of claim 1, wherein the determining comprises dropping a PDU of the first sequence number when the average size of the buffer is greater than a first value.

5. The reordering method of claim 4, further comprising dropping the PDU of the first sequence number according to a drop probability when the average size of the buffer is greater than a second value and less than the first value.

6. The reordering method of claim 5, wherein the average size of the buffer is calculated by using a moving average calculation equation that uses the number of bytes of the received PDU and an average number of bytes of PDUs received until a previous frame.

7. The reordering method of claim 6, wherein the drop probability is linearly controlled in accordance with the average size of the buffer.

8. The reordering method of claim 1, further comprising iteratively performing the transmitting and updating the first sequence number with the next sequence number of a PDU transmitted to the CS and reassembling unit while a PDU having a sequence number that is the same as the first sequence number updated with the next sequence number of the PDU transmitted to the CS and reassembling unit remains in the reordering buffer.

9. A reordering method for a terminal to reorder protocol data units (PDUs), the terminal supporting a hybrid automatic retransmission request and including a Convergence Sublayer (CS) and reassembling function unit that assembles reordered PDUs to a service data unit (SDU), the reordering method comprising:
   reordering PDUs by comparing the first sequence number of a PDU reordering sequence with the second sequence number of a received PDU;
   among PDUs stored in a reordering buffer that stores PDUs queued for reordering, transmitting a PDU that is stored in the reordering buffer for longer than a first time to the CS and reassembling function unit; and
   updating the first sequence number with the next sequence number of one of the PDU reordered in the reordering of the PDUs and the PDU transmitted to the CS and reassembling function unit in the transmitting of the PDU.

10. The reordering method of claim 9, wherein the reordering of the PDUs comprises:
    discarding the received PDU when the second sequence number is smaller than the first sequence number;
    transmitting the received PDU to the CS and reassembling function unit when the first sequence number and the second sequence number are identical; and
    storing the received PDU in the reordering buffer when the second sequence number is greater than the first sequence number.

11. The reordering method of claim 10, wherein the reordering of the PDUs further comprises:
    updating the first sequence number with the next sequence number of the first sequence number when the first sequence number and the second sequence number are identical;
    transmitting the first PDU to the CS and reassembling function unit when the first sequence number updated with the next sequence number of the first sequence number and the third sequence number of the first PDU among the PDUs stored in the reordering buffer are identical; and
    iteratively performing the updating of the first sequence number with the next sequence number of the first sequence number and the transmitting of the first PDU to the CS and reassembling function unit while the first sequence number updated with the next sequence number of the first sequence number and the third sequence number are identical.

12. The reordering method of claim 9, wherein a period of time during which a PDU is stored in the reordering buffer corresponds to a period of time from a frame at arrival of the corresponding PDU to the current frame.

13. The reordering method of claim 12, wherein the first time is set to be shorter than a retransmission timeout.

* * * * *